3,284,068
FLOW ADJUSTABLE WATER TROUGH MEANS FOR EVAPORATIVE COOLER PADS
Adam D. Goettl, Phoenix, Ariz., assignor to McGraw-Edison Company, Milwaukee, Wis., a corporation of Delaware
Filed Feb. 26, 1964, Ser. No. 347,415
3 Claims. (Cl. 261—97)

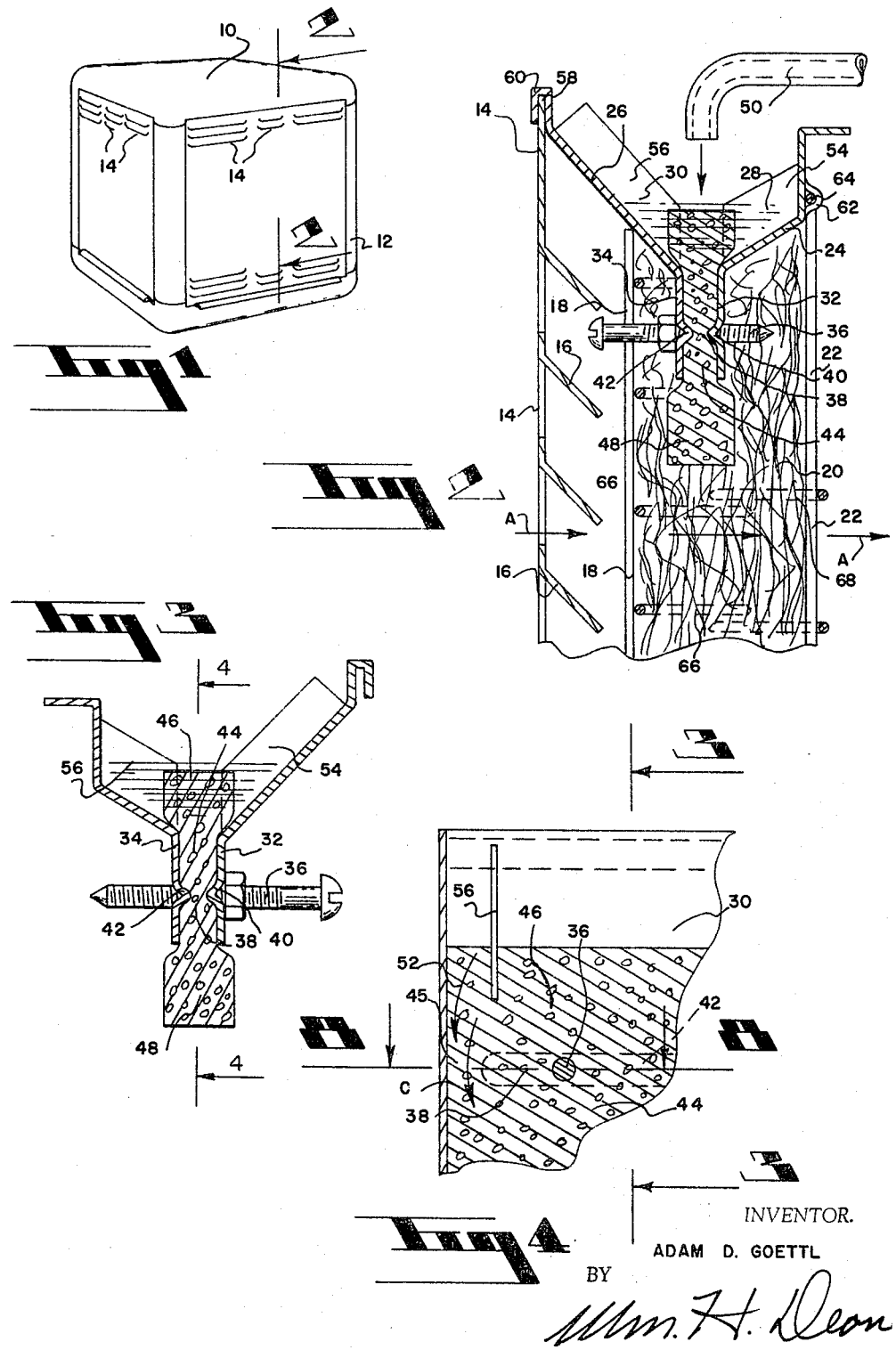

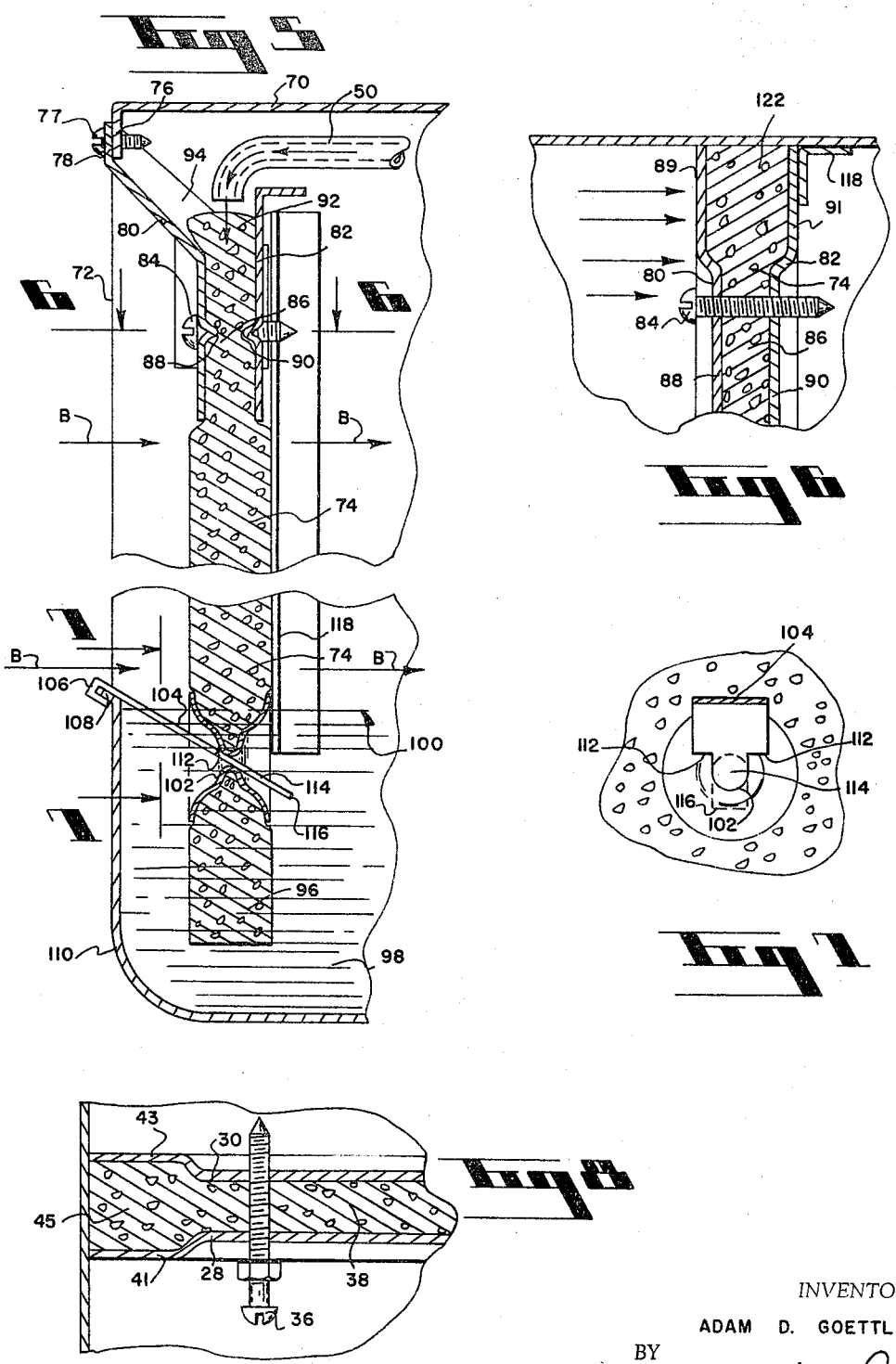

This invention relates to a flow adjustable water trough means for evaporative cooler pads, and, more particularly, to a flow adjustable water trough means for evaporative cooler pads wherein converging elements of an evaporative cooler pad trough are clamped together at opposite sides of a hygroscopic water distributor member in such a manner that compression of the hygroscopic distributor member may be varied to vary the flow of water downwardly therethrough to an evaporative cooler pad means, and whereby the hygroscopic distributor very evenly distributes water to an evaporative cooler pad means and thereby insures uniform delivery of water to such an evaporative cooler pad means.

In the art of flow distribution to evaporative cooler pads there have been many trough structures designed with attempts to provide uniform distribution of water to evaporative cooler pads, however various difficulties have been encountered with respect to maintenance of such structures as well as adjustability of flow of water to evaporative cooler pads, and also the even distribution of water to such pads when the trough may be slightly inclined or due to progressive collection of foreign matter which tend to clog or limit the flow of water from the outlet portions of the troughs. Many conventional water troughs utilized to feed and distribute water to the upper portions of evaporative cooler pads employ a trough structure having a plurality of outlet openings in the bottom thereof, which outlet openings are of various shapes, but all of which eventually become clogged with mineral deposits or other foreign matter, thereby either completely shutting off flow to some areas of the pads, or causing impairment of such flow in one area which greatly increases flow in another area of the pad, all of which causes inefficient performance of an evaporative cooler.

Whenever outlet openings in conventional water troughs are clogged or restricted the area directly below the pad may become dry due to a high flow rate of air therethrough, and particularly air of relatively low humidity. Thus, portions of the pad fed by conventional water troughs may be dry and permit a large volume flow of air therethrough without any evaporative cooling effect.

It has always been a problem to adjust the amount of flow to be delivered to an evaporative cooler pad in order to prevent water from being entrained in the air passing through an evaporative cooler pad, and, further, to prevent various difficulties, such as the progressive accumulation of mineral deposits, which, in some instances, may be due to an unusually high flow rate of water when the pad is subject to air flow therethrough.

Another problem has arisen in the supply of water to a plurality of troughs feeding a plurality of evaporative cooler pads in the same evaporative cooler. In many instances, a circulating pump is used to supply water to several evaporative cooler pads, and, accordingly, the overall amount of water required to maintain the desired or optimum function of the pads may be regulated by bypassing some water delivered by the pump or by throttling the overall output of the pump by a valve or other device. Thus, the water delivered by the pump is throttled to a predetermined amount, and then distributed through a plurality of distributors to a plurality of troughs feeding a plurality of evaporative cooler pads. Oftentimes these distribution systems are disturbed due to restrictions or other conditions of the individual conduits leading to the individual troughs, as for example, the evaporative cooler may be tilted and cause one conduit to deliver more water than another. Consequently, conventional evaporative cooler pad water troughs with a fixed outlet in the form of openings may operate with too much or too little water being delivered to the respective pad.

Accordingly, it is an object of the present invention to provide a flow adjustable water trough means for evaporative cooler pads which provides for the adjustment of flow from the trough to a pad so that the flow of water from the trough may be adjusted so as to constantly and uniformly supply an optimum amount of water to the pad regardless of an excessive amount of water delivered to the trough.

Another object of the invention is to provide a flow adjustable water trough means for evaporative cooler pads which permits an excessive amount of water to be delivered to the trough whereby the excess may flow from the ends of the trough at opposite edges of an evaporative cooler pad under the trough so that a maximum amount of water may be delivered to the trough and whereby the flow distributor in the trough of the invention limits the flow of water to the pad in an amount required for optimum operation thereof.

Another object of the invention is to provide a very novel flow adjustable water trough means for evaporative cooler pads wherein a pair of trough elements are clamped together at opposite sides of a compressible hygroscopic water distributor member in such a manner that the clamping elements may be clamped together to compress the distributor element sufficiently to control a desired amount of flow therethrough from the trough to an evaporative cooler pad therebelow.

Another object of the invention is to provide a flow adjustable water trough means for evaporative cooler pads wherein a pair of trough elements are provided with upper trough portions for receiving water and lower downwardly extending spaced clamping portions which are adjustable toward and away from each other, and a compressible hygroscopic water distributor element between said spaced portions and compressible to an extent to reduce flow therethrough so that an excess of water delivered to the trough portions above said spaced portions may flow away from the trough at opposite ends thereof and downwardly through uncompressed portions of the compressible distributor element disposed below and beyond opposite ends of said clamping portions.

Another object of the invention is to provide a flow adjustable water trough means for evaporative cooler pads wherein a pair of trough elements are provided with opposed clamping portions compressively engaging opposite sides of a sponge-like hygroscopic compressible water distributor whereby the character of the distributor is such that it uniformly absorbs and distributes water throughout its length and whereby the compressibility thereof permits the density of the material to be increased by reason of the clamping together of the trough portions at opposite sides thereof to thereby accomplish an optimum amount of water flow to be controlled and an even distribution thereof over and into an evaporative cooler pad means.

Another object of the invention is to provide a novel flow adjustable water trough means for evaporative cooler pads wherein opposed downwardly directed trough portions are disposed in spaced relationship to each other and provided with downwardly extending water distributor holders clamped against opposite sides of a sponge-like hygroscopic water distributor element; said trough portions having longitudinal indented portions directed toward each other to form a throttling structure for concentrating compressive forces at opposite sides of said compressible distributor element to insure finite adjustment of compression of the distributor element and corresponding regulation of water flow therethrough.

Another object of the invention is to provide a flow adjustable water trough means for evaporative cooler pads having a pair of opposed trough portions clamped together at opposite sides of a compressible hygroscopic water distributor element; said element extending above and below the portions of said trough elements clamped together at opposite sides thereof, whereby an upper end of the water distributor element is disposed to receive water in the trough portions and whereby the opposed portions of said trough clamped together at opposite sides of the distributor element may be adjusted toward and away from each other to cause relative compression of the distributor element to control flow therethrough while an uncompressed portion of the distributor element thereabove uniformly absorbs and distributes water over its entire length so that uniform flow at the compressed portions of the distributor element may be attained.

Another object of the invention is to provide a novel flow adjustable water trough means for evaporative cooler pads comprising a water trough and pad assembly wherein a sponge-like compressible hydroscopic evaporative cooler pad is compressively engaged at opposite sides and at its upper end by opposed portions of a water trough which are adjustably clamped together to provide a water receiving means and a flow restricting means operable by adjustment of the portions together to cause compression of the pad at its upper portion and to thereby cause a flow restriction therein, such that an optimum flow of water therethrough may be attained.

Another object of the invention is to provide a novel flow adjustable water trough means for evaporative cooler pads wherein a pair of opposed trough portions are clamped together at opposite sides of the upper end of a compressible hygroscopic evaporative cooler pad to adjust flow by compression of said upper portion of said pad, and whereby a lower portion of said pad extends into a water containing sump of an evaporative cooler to form an air seal and also to provide a constant hygroscopic wicking operation of the pad from the sump upwardly and from the trough downwardly.

Further objects and advantages of the invention may be apparent from the following specification, appended claims and accompanying drawings in which:

FIGURE 1 is a perspective view of an evaporative cooler;

FIGURE 2 is an enlarged fragmentary sectional view taken from the line 2—2 of FIGURE 1 showing a transverse section of a flow adjustable water trough means for evaporative coolers in accordance with the present invention;

FIGURE 3 is a cross sectional view of a flow adjustable water trough means similar to that shown in FIGURE 2 and in accordance with the present invention;

FIGURE 4 is a fragmentary sectional view taken from the line 4—4 of FIGURE 3;

FIGURE 5 is a view similar to FIGURE 2, but showing a modification of the invention wherein a flow adjustable water trough means of the invention is used in assembly with a compressible hygroscopic evaporative cooler pad which is held and clamped at the upper end by the trough to form a flow restriction device and distributor means and wherein the lower end of the pad extends into a water containing sump of an evaporative cooler;

FIGURE 6 is a fragmentary sectional view taken from the line 6—6 of FIGURE 5 showing the support of an edge of an evaporative cooler pad adjacent the side wall or cabinet of the evaporative cooler in accordance with the invention;

FIGURE 7 is an enlarged fragmentary sectional view taken from the line 7—7 of FIGURE 5; and FIGURE 8 is a fragmentary sectional view taken from the line 8—8 of FIGURE 4.

As shown in FIGURE 1 of the drawings, and in accordance with the present invention, an evaporative cooler 10 is provided with a cabinet 12 having a plurality of air inlet louver plates 14 in the side walls thereof. These louver plates 14, as shown in FIGURE 2, are provided with air inlet louvers 16 inwardly of which a wire pad rack 18 supports an evaporative cooler pad 20 which may be of aspen fibers or any other suitable or equivalent material.

An opposite side of the pad 20 from the wire rack 18 is supported by another rack 22.

At the upper portion of the pad 20 the invention comprises a pair of water trough members 24 and 26. These trough members 24 and 26 are provided with water receiving trough portions 28 and 30, respectively.

Integral with or carried by these trough portions 28 and 30 are distributor clamping and engaging portions 32 and 34, respectively. These clamping portions 32 and 34 are adjustably clamped together by screws or other suitable securing means 36 so that the clamping portions 32 and 34 may be clamped together in varying spaced relationship to each other to hold and compress a portion 38 of a sponge-like hygroscopic water distributor element therebetween. With reference to FIGURES 2 and 3 of the drawings, it will be seen that the clamping portions 32 and 34 are provided with opposed inwardly directed indented rib portions 40 and 42, respectively, which form means for concentrating compressive forces on the portion 38 of the sponge-like compressible hygroscopic water distributor element 44. The element 44 is provided with an upper end 46 above the compression clamping portions 40 and 42, and is provided with a lower end 48 below the clamping portions 40 and 42. Thus, water is received into the trough portions 28 and 30 through a conventional water distributor conduit 50 which may deliver an excess of water so that the upper portion 46 of the water distributor is completely soaked and the excess water may flow over the ends of the upper edge 46, as indicated by arrows 52 outwardly and beyond the confines of the evaporative cooler pad below the water distributor 44.

It will be noted that the uncompressed upper portion 46 includes substantial surface area for collection of mineral deposits and thereby tends to prolong the life of the compressed portion 38 and maintain a constant flow area therein.

The trough portions 28 and 30 are provided with flanges 54 and 56 near the ends thereof. These flanges extend upwardly toward the upper end 46 of the water distributor 44 and are contiguous therewith so that excess water delivered to the trough portions 28 and 30 may rise to the upper edge 46 of the water distributor 44 and then flow over the flanges 54 and 56 in accordance with the arrows 52 hereinbefore described. The trough portions 28 and 30, at opposite ends of the clamping portions 40 and 42, are flared in widely spaced portions 41 and 43 to hold portions 45 of the distributor in uncompressed condition to thereby permit free flow of excess water from the trough and downwardly through said uncompressed portions, as indicated by said arrows 52 to thereby bypass the cooler pad area below the trough portion.

It will be appreciated that the upper portion 46 of the compressible hygroscopic sponge-like water distributor element is in an uncompressed free form and able to absorb water to the fullest extent so that the compressed portion of the water distributor at 38 is uniformly supplied with water, the flow of which is regulated by the relative compression of the distributor element between the inwardly directed ribs 40 and 42 as hereinbefore described. Thus, compression of the material at 38 to a certain degree causes flow control of water downwardly through the distributor 44 and the uncompressed lower portion 48 uniformly distributes water to the evaporative cooler pad 20, as hereinbefore described.

The trough assembly, including the trough members 24 and 26, may be supported on an upper edge 58 of the louver plate 14 by a folded portion 60 of the trough portion 30 which fits over said upper edge 58 of the louver plate.

A struck out sheet metal loop 62 integral with the trough element 24 receives and holds an end 64 of wires disposed vertically in the rack 22. It will also be seen that the wire racks 18 and 22 are provided with horizontal wires having respective prongs 66 and 68 which extend into the evaporative cooler pad 20 and support the same in juxtaposition relative to the lower end portion 48 of the water distributor 44.

It will be understood by those skilled in the art that a blower or other means inside the housing 10 is used to force air through evaporative cooler pad 20 in a direction of the arrows A in FIGURE 2 of the drawings. It will be understood that this blower may be any conventional means known in the art, but which is not shown in the present disclosure due to the well known conventional blowers used to force air through evaporative cooler pads as indicated by the arrows A in FIGURE 2 of the drawings.

In the modified structure shown in FIGURES 5, 6 and 7, an evaporative cooler housing 70 is provided with an open side 72 disposed to receive air flow as indicated by arrows B, which may be induced by a conventional blower internally of the housing 70, which blower tends to force air in the direction of the arrows B and through a sponge-like compressible hygroscopic pad 74, as will be hereinafter described in detail.

The housing 70 is provided with a downwardly extending flange 76 at the uppermost portion of the open side 72, and secured to this flange 76 by means of screws 77 is an upstanding flange 78 of a trough member 80 which corresponds substantially with the trough portion 26 hereinbefore described. Thus, the evaporative cooler pad water trough portion 80 supports the pad 74 and another trough portion 82 which is clamped to the trough portion 80 by means of screws 84 or any other suitable means permitting these trough portions 82 and 84 to be clamped adjustably together at opposite sides of a compressed portion 86 of the compressible hygroscopic pad 74. Thus, the adjustably clamped relationship of the trough portions 80 and 82 corresponds with that hereinbefore described for the structures disclosed in FIGURES 2 and 3.

Likewise, the trough portion 80 is provided with a downwardly extending portion having an inwardly directed compression rib 88 spaced from an opposing like rib 90 of the trough portion 82. These ribs 88 and 90 oppose each other at the flow controlling compressed portion 86 of the hygroscopic pad 74 and an upper uncompressed portion of the pad 74 designated 92 is in the trough area 94 and disposed to freely receive water from a water distributor conduit 50, as hereinbefore described. At opposite ends of the trough structure the clamping ribs 88 and 90 are omitted and the respective trough members are flared apart at 89 and 91 to permit the excess water to flow freely down through uncompressed portions 122 at opposite ends of the compressed portion 86 of the pad 74. A portion of the pad 74 extending below the trough elements 80 and 82 is suspended adjacent the opening 72 to receive air flow therethrough. A lower portion 96 of the hygroscopic pad 74 is disposed in a sump 98 of the evaporative cooler structure below the water level 100 therein so that water is wicked up through the pad as well as received downwardly therethrough from the restriction 86 imposed by compression between the ribs 88 and 90.

The pad 74 below the water line 100 is provided with an open eyelet structure 102 similar to those used in canvas construction. This eyelet may be of non-corrosive metal or plastic as desired.

A holding bar 104 is provided with a clip 106 engaging an upper edge 108 of a sump pan side wall 110 of the evaporative cooler sump. This bar 104 is provided with shoulders 112 adjacent to a tongue portion 114 which extends through a central opening in the eyelet 102. Thus, the shoulders 112 locate the eyelet 102 relative to the side wall 110 of the evaporative cooler sump, and the tongue 114 extends downwardly through the eyelet 102 on an angle whereby a lower end 116 of the tongue 114 is below the eyelet 102 and thereby laterally secures and holds the lower end of the pad 74 in lateral juxtaposition adjacent to angle bars 118 secured to inner opposite sides of the cabinet 70 to form rest faces 120 against which the opposite ends of the pad 74 at its rear edges rest when air is forced to flow therethrough in the direction of the arrows B.

Operation of the structure shown in FIGURE 5 is similar to that disclosed in connection with the structures shown and described in FIGURES 2 and 3 of the drawings. However, the bar 104 and the continuous pad 74 integral with the distributor portion thereof clamped between the trough elements 80 and 82 provides a very novel assembly of an adjustable flow water trough means and an evaporative cooler pad. This is particularly true since the trough supports the pad and restricts by compression forces the upper portion of the pad to control the flow of water therethrough so that even distribution of water flows through the pad and so that a desired optimum amount of water flows through the pad while excess water delivered by the conduit 50 may flow over upper opposite ends of the pad and downwardly through uncompressed portions 122 of the pad adjacent the cabinet shown in FIGURE 6 of the drawings so that the water is permitted to overflow opposite edges of the pad forwardly of the angle bars 118, thereby to prevent undue wetting of the pad and yet to permit overflow of water relative to the pad in an area in which it will not unduly affect a large area of the evaporative cooler pad.

It will be obvious to those skilled in the art that various modifications of the invention may be resorted to in a manner limited only by a just interpretation of the following claims.

I claim:

1. In a flow adjustable water distributor means for evaporative cooler pads the combination of: conduit means for delivering water to an area above an evaporative cooler pad; a compressible hygroscopic distributor element disposed to receive water from said conduit means; and opposed clamp means engaging opposite sides of said compressible distributor element and disposed to contain water therebetween in said distributor element and disposed to hold an area of said distributor element in compression to control flow and distribution of water therethrough; a portion of said distributor element above said opposed clamp means being in relatively uncompressed condition; a portion of said distributor element, below said clamp means, being relatively uncompressed and adapted to uniformly deliver water to an evaporative cooler pad element therebelow; and an evaporative cooler pad below said relatively uncompressed portion.

2. In a flow adjustable water distributor means for evaporative cooler pads the combination of: conduit means for delivering water to an area above an evaporative cooler pad; a compressible hygroscopic distributor element disposed to receive water from said conduit means; and opposed clamp means engaging opposite sides of said compressible distributor element and disposed to contain water therebetween in said distributor element and disposed to hold an area of said distributor element in compression to control flow and distribution of water therethrough; upwardly diverging trough portions integral with said opposed clamp means, flange portions at opposite ends of said upwardly diverging trough portions; and an upper portion of said compressible distributor element extending upwardly into said diverging trough portions and having an upper level disposed to permit excess water delivered to said trough portions and said distributor element to flow over the top of said distributor element and over the upper edges of said flanges to escape at opposite side edges thereof and to substantially clear and bypass a major portion of an evaporative cooler pad area positioned therebelow.

3. In a flow adjustable water distributor means for evaporative cooler pads the combination of: trough means for delivering water to an area above an evaporative cooler pad; a compressible hygroscopic distributor element disposed to receive water from said trough means; and opposed adjustable clamp means integral with said trough means and engaging opposite sides of said compressible distributor element and disposed to contain water therebetween in said distributor element and disposed to hold an area of said distributor element in compression to control flow and distribution of water therethrough; an uncompressed portion of said distributor element disposed at one lateral end of said clamp means to permit relatively free flow of water downwardly through said uncompressed portion to drain the excess water from said distributor element.

References Cited by the Examiner
UNITED STATES PATENTS

| | | | |
|---|---|---|---|
| 1,109,567 | 9/1914 | Clifford | 261—106 |
| 1,841,536 | 1/1932 | Jordahl | 261—99 |
| 2,187,019 | 1/1940 | Mund et al. | 261—97 XR |
| 2,271,342 | 1/1942 | Korts | 261—106 |
| 2,356,757 | 8/1944 | Fleisher | 261—106 XR |
| 2,637,540 | 5/1953 | Rowe. | |
| 2,827,270 | 3/1958 | Martin | 261—97 XR |
| 3,033,193 | 5/1962 | Rathman | 126—113 |
| 3,075,750 | 1/1963 | Goettl | 261—97 |
| 3,139,462 | 6/1964 | Scott | 261—106 XR |
| 3,193,259 | 7/1965 | Liebmann | 261—97 XR |

HARRY B. THORNTON, *Primary Examiner.*

T. R. MILES, *Assistant Examiner.*